United States Patent
Oyashiki et al.

(10) Patent No.: US 11,338,246 B2
(45) Date of Patent: May 24, 2022

(54) NOZZLE FILTER

(71) Applicant: ENTEGRIS, Inc., Billerica, MA (US)

(72) Inventors: Yasushi Oyashiki, Narashino (JP); Satoshi Kamimoto, Yokohama (JP)

(73) Assignee: ENTEGRIS, INC., Billerica, MA (US)

( * ) Notice: Subject to any disclaimer, the term of this patent is extended or adjusted under 35 U.S.C. 154(b) by 201 days.

(21) Appl. No.: 16/089,556

(22) PCT Filed: Mar. 30, 2017

(86) PCT No.: PCT/US2017/025030
§ 371 (c)(1),
(2) Date: Sep. 28, 2018

(87) PCT Pub. No.: WO2017/173084
PCT Pub. Date: Oct. 5, 2017

(65) Prior Publication Data
US 2019/0111394 A1    Apr. 18, 2019

Related U.S. Application Data

(60) Provisional application No. 62/316,275, filed on Mar. 31, 2016.

(51) Int. Cl.
*B01D 63/02* (2006.01)
*B01D 35/30* (2006.01)

(52) U.S. Cl.
CPC .......... *B01D 63/024* (2013.01); *B01D 35/30* (2013.01); *B01D 2313/13* (2013.01); *B01D 2313/40* (2013.01)

(58) Field of Classification Search
CPC ...... B01D 35/30; B01D 63/02; B01D 63/023; B01D 63/024; B01D 2313/13; B01D 2313/40
See application file for complete search history.

(56) References Cited

U.S. PATENT DOCUMENTS

| 6,270,674 B1 * | 8/2001 | Baurmeister .......... B01D 15/08 210/321.79 |
| 2003/0164333 A1 * | 9/2003 | Nohren, Jr. .......... B01D 63/024 210/650 |
| 2004/0020844 A1 | 2/2004 | Rynbeck |

(Continued)

FOREIGN PATENT DOCUMENTS

| JP | 2002370006 A | 12/2002 |
| JP | 2004194720 A | 7/2004 |

(Continued)

OTHER PUBLICATIONS

JP2015150468A—EPO Machine Translation (Year: 2020).*

*Primary Examiner* — Patrick Orme
(74) *Attorney, Agent, or Firm* — Entegris, Inc.

(57) ABSTRACT

Devices and methods for the filtration of particulates from a liquid stream are provided. A filter cartridge includes a housing configured to be placed in-line with a stream of liquid and a plurality of hollow fiber filter members disposed within the housing. The hollow fiber filter members are potted at one end of the housing and configured to capture particulates from the stream of liquid via surface energy. The filter cartridge can provide low pressure loss filtering and is capable of being placed within a small space.

16 Claims, 3 Drawing Sheets

(56) References Cited

U.S. PATENT DOCUMENTS

| | | | |
|---|---|---|---|
| 2004/0045893 A1* | 3/2004 | Watanabe | B01D 69/084 210/321.79 |
| 2005/0161388 A1 | 7/2005 | Williams | |
| 2008/0060990 A1 | 3/2008 | Bernard | |
| 2009/0283460 A1 | 11/2009 | Collins | |
| 2014/0319045 A1 | 10/2014 | Shevitz | |

FOREIGN PATENT DOCUMENTS

| | | | |
|---|---|---|---|
| JP | 2006068689 A | | 3/2006 |
| JP | 2006130396 A | | 5/2006 |
| JP | 2015150468 A | * | 8/2015 |
| JP | 2015150468 A | | 8/2015 |
| WO | 2004054625 A2 | | 7/2004 |
| WO | 2013129384 A1 | | 9/2013 |
| WO | 2014030585 A1 | | 2/2014 |

* cited by examiner

NOZZLE FILTER

CROSS-REFERENCE TO RELATED APPLICATIONS

This application is filed under the provisions of 35 U.S.C. § 371 claiming priority of International Patent Application No. PCT/US2017/025030 filed on Mar. 30, 2017, which further claims the benefit under 35 USC 119 of U.S. Provisional Patent Application No. 62/316,275, filed Mar. 31, 2016, the disclosures of which are hereby incorporated herein by reference in their entirety for all purposes.

BACKGROUND

Filtration often results in an undesirable pressure drop from the point at which a liquid feed enters a filter to the point at which the liquid is emitted from the filter. As liquid is forced through a filter media, it encounters resistance with the media, resulting in a reduced flow rate of the liquid. High pressure drops over a filter are undesirable in some applications, for example, where pressure build-up upstream of the filter is to be avoided or where a consistent flow rate of a liquid before and after filtration is desired.

Some microfabrication processes, such as photolithography, require extremely clean operating conditions, including the removal of particles from recirculating etch baths. Also, due to the complexity and small size of the articles being produced, it is desirable to utilize filtration equipment capable of being arranged within a small space.

SUMMARY OF THE INVENTION

This disclosure pertains to methods of filtration and filter cartridges or nozzles for removing particulates or contaminants from a fluid, such as a liquid or gas stream. In particular, this disclosure is directed to filter cartridges or nozzles that can provide low pressure loss filtering and that are capable of being placed within a small space.

One embodiment of a filter cartridge includes a housing configured to be placed in-line with a stream of liquid or gas and a plurality of hollow fiber filter members disposed within the housing. The hollow fiber filter members in certain aspects are configured to capture particulates from the stream of liquid or gas via surface energy. Due to the open configuration of the hollow fibers and filtration via non-sieving retention, a fluid is able to pass through the filter cartridge without a significant drop in pressure.

This disclosure is also directed to a method of filtering a liquid or gas feed includes directing a stream of liquid or gas through a version of a filter cartridge and capturing particulates contained within the liquid or gas at the hollow fiber filter elements of the filter cartridge.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

While this invention will be particularly shown and described with references to example embodiments thereof, it will be understood by those skilled in the art that various changes in form and details may be made therein without departing from the scope of the invention encompassed by the appended claims.

While various compositions and methods are described, it is to be understood that this invention is not limited to the particular molecules, compositions, designs, methodologies or protocols described, as these may vary. It is also to be understood that the terminology used in the description is for the purpose of describing the particular versions or versions only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "hollow fiber" is a reference to one or more hollow fiber elements and equivalents thereof known to those skilled in the art, and so forth. Unless defined otherwise, all technical and scientific terms used herein have the same meanings as commonly understood by one of ordinary skill in the art. Methods and materials similar or equivalent to those described herein can be used in the practice or testing of versions of the present invention. All publications mentioned herein are incorporated by reference in their entirety. Nothing herein is to be construed as an admission that the invention is not entitled to antedate such disclosure by virtue of prior invention. "Optional" or "optionally" means that the subsequently described event or circumstance may or may not occur, and that the description includes instances where the event occurs and instances where it does not. All numeric values herein can be modified by the term "about," whether or not explicitly indicated. The term "about" generally refers to a range of numbers that one of skill in the art would consider equivalent to the recited value (i.e., having the same function or result). In some versions the term "about" refers to 10% of the stated value, in other versions the term "about" refers to ±2% of the stated value.

Figure 1:
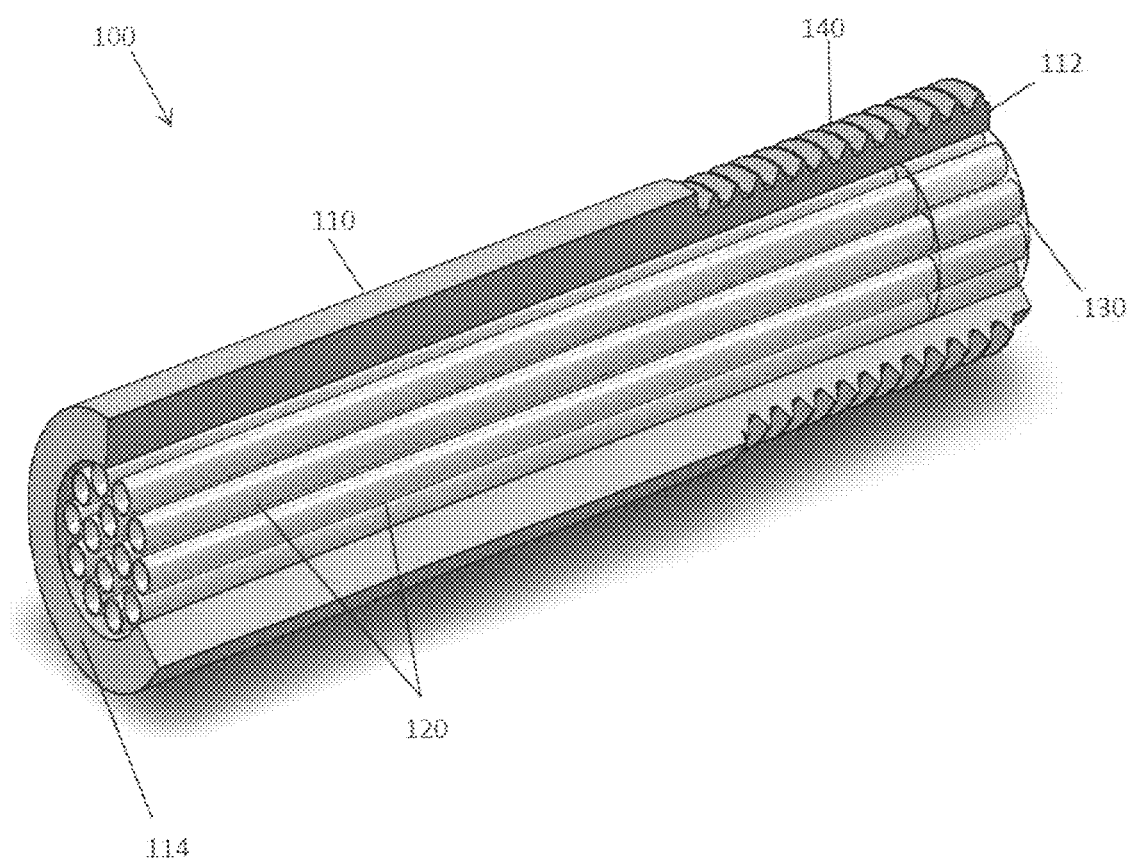
FIG. 1 is a perspective view of a filter cartridge, illustrating hollow fibers contained within the cartridge through a partial cut-away view of the cartridge housing.
Figure 2:
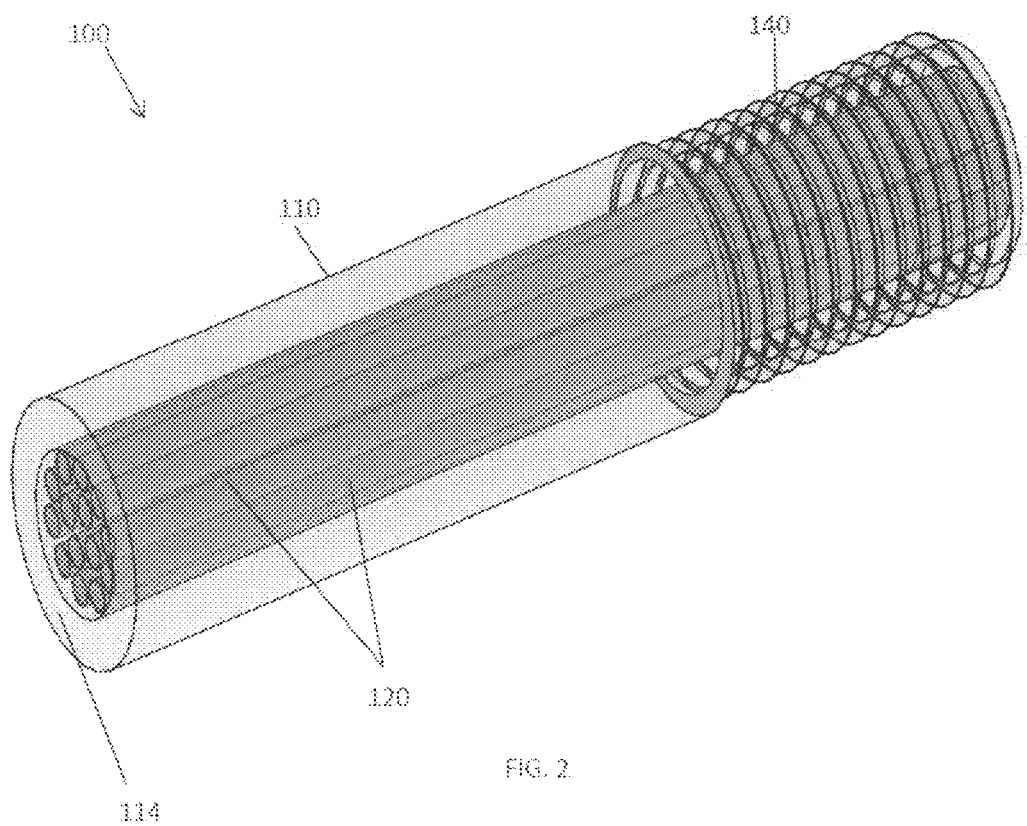
FIG. 2 is a perspective view of the cartridge of FIG. 1 with the housing transparently illustrated.

An example version of a filter cartridge 100 is illustrated in FIGS. 1 and 2. The filter cartridge, or nozzle, includes a housing 110 having a hollow center. Disposed within the hollow center of the housing 110 is a plurality of filter members 120. The housing can be, for example, cylindrical or tubular in shape, such as a tube having a diameter of about 5 mm to about 25 mm. For example, the housing can be a tube having a diameter of about 0.25 inch (6.35 mm), about 0.5 inch (12.7 mm), about 0.75 inch (19.1 mm), or about 1 inch (25.4). Housing 110 can include threads 140 located about an exterior surface at one end of the cartridge 100, as shown in FIGS. 1 and 2. Alternatively, threads 140 can be included at both ends of the housing 110. Threads 140 can provide a fluid-tight connection with other elements, such as tubing, piping, gauges, tools, or other elements upstream and downstream in an equipment line or in a processing system.

Alternative connection mechanisms are possible. For example, cartridge 100 can be threaded, press-fit or welded to other elements.

The housing can be formed from materials including polymers. Non-limiting examples of polymers suitable for the housing include a polyamide such as nylon, a fluoropolymer such as a perfluoroalkoxy alkane (PFA), and a polyolefin such as polyethylene (PE). The housing can have a length that is capable of being placed within a small space in an equipment line. For example, in certain embodiments the housing can have a length of about 10 mm to about 1000 mm.

The filter members 120 can be hollow fibers that are open on both ends. As shown in FIGS. 1 and 2, hollow fiber filter members 120 have a length that is approximately equivalent to the length of the housing 110, such that the filter members 120 extend from a first end 112 to a second end 114 of the cartridge 100. Alternatively, the hollow fiber filter members can extend over only a portion of the length of the cartridge. In a further alternative version, the lengths of individual hollow fiber filter members within a cartridge can be of different lengths. For example, some or all hollow fiber filter members 120 can have lengths that are approximately half, two-thirds, or three-quarters of the length of the housing 110. Alternatively, all hollow fiber filter members can have a length that is approximately equivalent to the length of the housing (e.g., from about 10 mm to about 1000 mm) with some of the hollow fiber members being slightly longer than others (e.g., from about 1 mm to about 5 mm longer) to provide additional surface area.

In some embodiments, the hollow fiber filter members 120 can be potted in the housing 110 with potting material 130. As depicted in FIG. 1, the potting material 130 may be included only at one end of the cartridge in order to improve or enhance air release within the cartridge. Alternatively, potting material can be included at additional locations within the cartridge or at either end, depending upon the selected construction of the housing. The potting material 130 can be a polyolefin, a fluoropolymer, a polyamide, or similar material. Potting material 130 can secure hollow fiber filter members within the housing 110. For example, by securing the filter members 120 to each other and to the housing 110 at one end of the cartridge 100, potting material 130 can prevent the filter members from shifting or buckling within the housing, which could obstruct the flow of fluid or gas through the cartridge. Additionally, potting material 130 can be used to seal space around the hollow fiber filter elements from a flow of liquid or gas, such that the liquid or gas is directed to flow through the hollow interior spaces of the filter elements rather than along the exterior surfaces of the filter elements.

Figure 3:
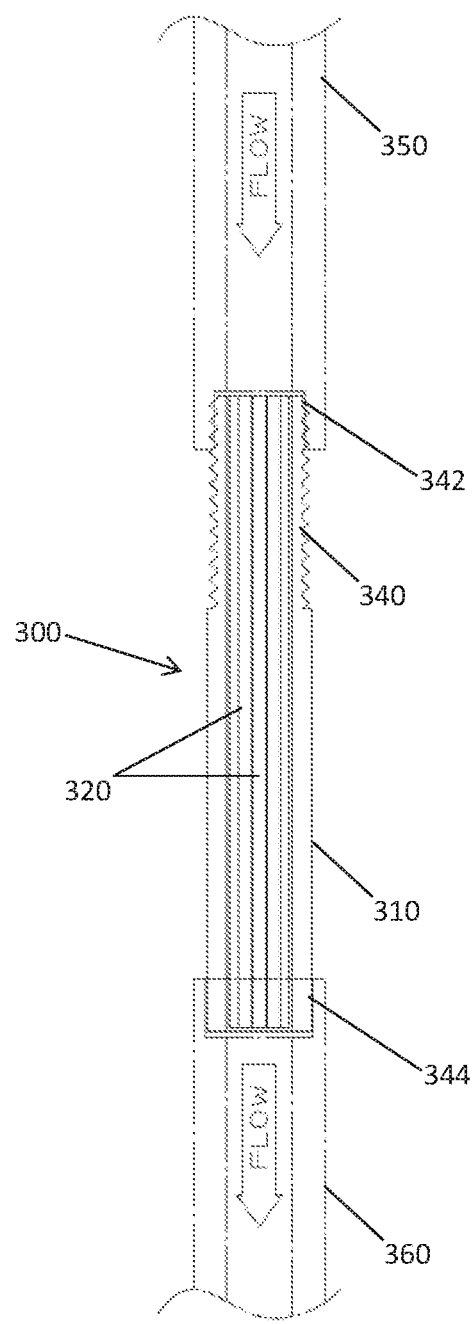
FIG. 3 is a schematic of a filter cartridge connected in serial with two hoses.

Filter cartridges can be configured to be placed in-line with a stream, or flow, of liquid or gas, as illustrated in FIG. 3. Filter cartridge 300 is located between tubes 350, 360. At a first end of the cartridge 300, threads 340 are engaged with corresponding threads 342 of tube 350. At a second end of the cartridge 300, the housing 310 is configured to press-fit within corresponding section 344 of tube 360. Although filter cartridge 300 is illustrated in FIG. 3 with one end that is threaded to tube 350 and one end that is press-fit into tube 360, alternative configurations of connection types are possible. For example, filter cartridge 300 could be press-fit at both ends, or welded at both ends, to tubes 350, 360. Alternatively, one end of filter cartridge 300 may be welded to a tube 350 with the other end of the cartridge press-fit or threaded to tube 360. Filter cartridge 300 can be configured to securely couple with tubes 350 and 360, such that fluid-tight connections are formed.

Filter cartridges 100, 300 can be placed within the normal flow path of a liquid or gas in a processing system, such as, for example, recirculation systems for cleaning photoresist compositions. For example, filter cartridges 100, 300 can be inserted into a section of tubing or piping, such that the flow path of the liquid through the cartridge remains approximately linear with the flow path of the liquid through the connected tubing or piping. As liquid enters the cartridge 100, 300, it passes, in parallel, through the hollow fiber filter elements 120, 320, which are open on both ends.

Particulates within the liquid can be captured by the hollow fiber filter elements 120, 320 via a non-sieving retention mechanism. As used herein, "non-sieving retention mechanism" refers to retention that occurs by mechanisms, such as interception, diffusion, adsorption, or combinations thereof that are not related to the pressure drop or bubble point of the filter or the hollow fibers. For example, particulates can be captured by surface energy at the inner surfaces of the hollow fibers (e.g., exposed polar group(s) of a polymer membrane forming the hollow fibers). Due to the open configuration of the hollow fibers and filtration via non-sieving retention, a liquid is able to pass through the filter cartridge 100, 300 without a significant drop in pressure. The filter cartridge 100, 300, thus provides low pressure loss filtering, which enables the liquid to be used downstream from the filter without additional pressurization. Low pressure loss filtering is particularly useful in recirculating etch baths, which often require rapid bath turnover. For example, in one version, filter cartridges 100, 300 provide pressure losses of about 1 kPa or less.

In an example version of a filter cartridge, hollow fiber filter members 120, 320 are formed from a non-sieving membrane. As used herein, "non-sieving membrane" refers to a membrane that captures particles or is optimized to capture particles primarily via non-sieving retention mechanisms, including, for example, adsorption, interception, diffusion, or combinations thereof. Particle adsorption to membrane surfaces can be mediated by, for example, intermolecular Van der Waals and electrostatic forces. Interception occurs when a particle travelling through a membrane cannot change direction fast enough to avoid contact with the membrane. Particle transport due to diffusion results from random or Brownian motion of predominantly small particles, which creates a certain probability that the particles will collide with the filter media.

In an example version of a filter cartridge, hollow fiber filter members 120, 320 are formed from polymer material having a polar group at a main chain or a side chain of the polymer. For example, hollow fiber filter members can be formed from polyamide, polyimide, polyketone, polyester, or a combination thereof. Polar groups located at a main chain or a side chain of the polymer material are capable of capturing charged particles, or particulates, through particle adsorption mechanisms. Intramolecular Van der Waals forces and attractive electrostatic interactions between the particles and the inner surfaces of the hollow fiber membranes can provide for the transport of the particles to the membrane surfaces. The particles can thus be removed from the liquid as the liquid travels through the hollow fiber filter members.

For example, a version of a filter cartridge includes hollow fiber filter members that are formed from polyamide, such as nylon 6, and having a positive charge density. Particles, such as metal colloids and organic polymer gels, can be negatively charged. As the particles travel through the hollow fiber filter members, adsorption can occur, thereby removing the particles from the liquid stream. In other versions of a filter cartridge, the charge interaction between the hollow fiber filter members and the particles may be reversed. For example, the filter members may have a negative charge density and the particles may be positively charged.

Besides attractive electrostatic interactions, interception and diffusion mechanisms can also be used to capture and retain particles within hollow fiber filter members 120, 320. In the absence of a repulsive force between the membrane and particles, such as would occur with same charge interactions (i.e., positive-positive or negative-negative interactions), or where the membrane and/or particle carries a neutral-zero charge, particles can be captured by the membrane through contact or collision with the membrane.

In some aspects, versions of filter cartridges can have percent retention rates of about 20%, 30%, 50%, or 60% to about 65%, 75%, 85%, or 90%. "Percent retention" as used herein, refers to the percentage of particles removed from a fluid stream by a filtration member placed in the pathway of the fluid stream. Non-sieving percent retention can be assessed using, for example, gold nanoparticles or nanometer-sized beads. Nanometer-sized fluorescent polystyrene latex (PSL) beads can be used to measure percent retention of the filter members and microporous membranes of the invention. In some versions of the invention, the fluorescent nanoparticles are G25 particles. G25 particles are distributed by Duke Scientific who lists the nominal diameter of the particles at 25 nanometers. However, particles in the range of 20 nanometers to 30 nanometers, in some cases 21 nanometers to 24 nanometers, can be used. The percent fluorescent particle monolayer coverage used to evaluate the filter members can be between 1% and 30%, although other percent monolayer coverage can also be used.

Although the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims. In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising." Also, the term "exemplary" is merely meant to mean an example, rather than the best. It is also to be appreciated that features and/or elements depicted herein are illustrated with particular dimensions and/or orientations relative to one another for purposes of simplicity and ease of understanding, and that the actual dimensions and/or orientations may differ substantially from that illustrated herein.

Although the present invention has been described in considerable detail with reference to certain versions thereof, other versions are possible. Therefore the spirit and scope of the appended claims should not be limited to the description and the versions contained within this specification.

The teachings of all patents, published applications and references cited herein are incorporated by reference in their entirety.

What is claimed is:

1. A filter cartridge, comprising:
    a housing having two ends and configured to be placed in-line with a stream of liquid; and
    a plurality of hollow fiber filter members disposed within the housing, the hollow fiber filter members configured to capture particulates from the stream of liquid through a non-sieving retention mechanism with a pressure loss of 1 kPa or less,
    wherein the hollow fiber filter members are potted with potting material at both ends of the housing to secure the hollow fiber filter members within the housing and to seal space around the hollow fiber filter members to direct flow of the stream of liquid to travel through interior spaces of the hollow fiber filter members rather than along the exterior spaces.

2. The filter cartridge of claim 1, wherein the non-sieving retention mechanism comprises adsorption, interception, diffusion or combinations thereof.

3. The filter cartridge of claim 1, wherein the housing is cylindrical and has a diameter of about 5 mm to about 25 mm.

4. The filter cartridge of claim 1, wherein the two ends of the housing are threaded, press-fit, or welded to a connecting member.

5. The filter cartridge of claim 1, wherein the housing has a length of about 10 mm to about 1000 mm.

6. The filter cartridge of claim 1, wherein the potting material comprises a polyolefin, a polyamide, a fluoropolymer or a combination thereof.

7. The filter cartridge of claim 1, wherein the hollow fiber filter members are formed from polymer material having a polar group at a main chain or a side chain of the polymer.

8. The filter cartridge of claim 7, wherein the polymer comprises polyamide, polyimide, polyketone, polyester, or a combination thereof.

9. A method of filtering a liquid feed, comprising:
    directing a stream of liquid through a filter cartridge comprising;
        a housing having two ends and configured to be placed in-line with the stream of liquid and
        a plurality of hollow fiber filter members disposed within the housing, the hollow fiber filter members configured to capture particulates from the stream of liquid through a non-sieving retention mechanism with a pressure loss of 1 kPa or less,
        wherein the hollow fiber filter members are potted with potting material to secure the hollow fiber filter members within the housing and to seal space around the hollow fiber filter members,
    directing the stream of liquid to flow through interior spaces of the hollow fiber filter members rather than along exterior spaces, and
    capturing particulates contained within the liquid at the hollow fiber filter members.

10. The method of claim 9, wherein the non-sieving retention mechanism comprises adsorption, interception, diffusion or combinations thereof.

11. The method of claim 9, wherein the housing is cylindrical and has a diameter of about 5 mm to about 25 mm.

12. The method of claim 9, wherein the two ends of the housing are threaded, press-fit, or welded to a connecting member.

13. The method of claim 9, wherein the housing has a length of about 10 mm to about 1000 mm.

14. The method of claim 9, wherein the potting material comprises a polyolefin, a polyamide, a fluoropolymer or a combination thereof.

15. The method of claim 9, wherein the hollow fiber filter members are formed from polymer material having a polar group at a main chain or a side chain of the polymer.

16. The method claim 15, wherein the polymer comprises polyamide, polyimide, polyketone, polyester, or a combination thereof.

\* \* \* \* \*